(12) United States Patent
Sakakibara et al.

(10) Patent No.: US 12,014,302 B2
(45) Date of Patent: Jun. 18, 2024

(54) INFORMATION PROCESSING APPARATUS, INFORMATION PROCESSING SYSTEM, INFORMATION PROCESSING METHOD, INFORMATION PROCESSING PROGRAM, AND DISPLAY DEVICE

(71) Applicant: KABUSHIKI KAISHA TOSHIBA, Tokyo (JP)

(72) Inventors: Shizu Sakakibara, Kawasaki Kanagawa (JP); Hidekazu Saito, Katsushika Tokyo (JP); Takufumi Yoshida, Funabashi Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 171 days.

(21) Appl. No.: 17/015,274

(22) Filed: Sep. 9, 2020

(65) Prior Publication Data

US 2021/0272065 A1    Sep. 2, 2021

(30) Foreign Application Priority Data

Feb. 27, 2020   (JP) .................................. 2020-031971

(51) Int. Cl.
*G06Q 10/06*       (2023.01)
*G06F 16/29*       (2019.01)
*G06Q 10/04*       (2023.01)
*G06Q 10/0631*     (2023.01)
*G06Q 10/083*      (2023.01)

(52) U.S. Cl.
CPC ....... *G06Q 10/06313* (2013.01); *G06F 16/29* (2019.01); *G06Q 10/04* (2013.01); *G06Q 10/0838* (2013.01)

(58) Field of Classification Search
CPC ........................................................ G06Q 10/06
See application file for complete search history.

(56) References Cited

U.S. PATENT DOCUMENTS 10,198,707 B1 *    2/2019   Bolton ............... G06Q 10/0837
2013/0339266 A1 * 12/2013   Looman .............. G05D 1/0291
                                                                705/338
(Continued)

FOREIGN PATENT DOCUMENTS

CN        107766962 A    3/2018
JP         5037927 B2   10/2012
(Continued)

OTHER PUBLICATIONS

Sawadsitang, Suttinee, et al. "Re-route Package Pickup and Delivery Planning with Random Demands." 2019 IEEE 90th Vehicular Technology Conference (VTC2019-Fall). IEEE, (Year: 2019).*

(Continued)

*Primary Examiner* — Kurtis Gills
(74) *Attorney, Agent, or Firm* — Finnegan, Henderson, Farabow, Garrett & Dunner, LLP

(57) ABSTRACT

According to one embodiment, an information processing apparatus according to an embodiment includes an extractor 7 configured to extract a representative point that appears at a rate higher than or equal to a predetermined appearance rate, based on a point included in package historical data recorded when a package is delivered and a delivery plan creator 8 configured to create a first delivery plan with respect to the representative point.

24 Claims, 14 Drawing Sheets

(56) References Cited

U.S. PATENT DOCUMENTS

| | | | | |
|---|---|---|---|---|
| 2014/0188389 A1* | 7/2014 | Rego | ............... | G06Q 10/047 |
| | | | | 701/533 |
| 2019/0303857 A1* | 10/2019 | Lecue | ............. | G06Q 10/08355 |
| 2019/0347513 A1* | 11/2019 | Salti | ................ | G06Q 30/0205 |
| 2020/0292346 A1* | 9/2020 | Turner | .............. | G06Q 10/047 |
| 2021/0035064 A1* | 2/2021 | Nishikawa | ............ | B65G 61/00 |

FOREIGN PATENT DOCUMENTS

| | | | | | |
|---|---|---|---|---|---|
| JP | | 5079067 B2 | 11/2012 | | |
| JP | | 5925483 B2 | 5/2016 | | |
| WO | WO-2004038601 A1 * | | 5/2004 | .......... | G06Q 10/047 |
| WO | WO-2020003832 A1 * | | 1/2020 | ............ | A61B 5/024 |

OTHER PUBLICATIONS

Youtube video "Route4Me—Asking the Right Questions—How to Evaluate A Route Optimization", uploaded by Route4Me, Mar. 20, 2017, https://www.youtube.com/watch?v=JY11Q7O1ea0 (Year: 2017).*

* cited by examiner

| PACKAGE HISTORICAL DATA | DELIVERY DATE | POINT | DELIVERY TIME ZONE | VOLUME | WEIGHT | UNLOADING TIME | PACKAGE FORM | PACKAGE TYPE | SHIPPER | WEEKDAY/HOLIDAY | SEASON | PEAK SEASON |
|---|---|---|---|---|---|---|---|---|---|---|---|---|
| 1 | 2019/4/3 | 1 | 12:00-14:00 | 0.1 | 0.001 | 5 | BOX | NORMAL | ○○ | WEEKDAY | SPRING | NORMAL |
| 2 | 2018/12/20 | 5 | 7:00-12:00 | 0.3 | 0.02 | 10 | BOX | NORMAL | △△ | WEEKDAY | WINTER | CHRISTMAS |
| 3 | 2019/8/4 | 17 | 9:00-14:00 | 0.5 | 0.1 | 5 | IRREGULAR | FROZEN | ○△ | HOLIDAY | SUMMER | NORMAL |
| 4 | 2019/8/13 | 17 | 9:00-14:00 | 0.5 | 0.1 | 5 | BOX | NORMAL | ○△ | WEEKDAY | SUMMER | OBON |
| ... | | | | | | | | | | | | |

FIG. 2

| TRACK DATA | TRUCK TYPE | MAXIMUM VOLUME | MAXIMUM CAPACITY | REGULAR TRUCK FEE | CHARTER TRUCK FEE | MAXIMUM NUMBER OF REGULAR TRUCKS | MAXIMUM NUMBER OF CHARTER TRUCKS |
|---|---|---|---|---|---|---|---|
| 1 | 2t TRUCK | 12 | 2000 | 3000 | 4000 | 10 | 1 |
| 2 | 4t TRUCK | 25 | 4000 | 5000 | NONE | 2 | 0 |
| 3 | REFRIGERATED VEHICLE | 5 | 1000 | 3200 | 5000 | 5 | 5 |
| 4 | 2t TRUCK | 12 | 2000 | 2900 | NONE | 10 | 0 |

FIG. 3

| INTER-POINT DISTANCE DATA | POINT | POINT | DISTANCE | TIME |
|---|---|---|---|---|
| 1 | 1 | 2 | 12.34 | 3.5 |
| 2 | 1 | 3 | 56.78 | 12.9 |
| 3 | 1 | 4 | 91.23 | 100.3 |
| 4 | 2 | 3 | 45.67 | 23.45 |
| 5 | 2 | 4 | 89.10 | 67.89 |
| ... | | | | |

FIG. 4

| DELIVERY PLAN | TRACK DATA | REPRESENTATIVE POINT | ARRIVAL TIME | DEPARTURE TIME |
|---|---|---|---|---|
| 1 | 1 | 1 | 3:00 | 4:00 |
| 1 | 1 | 7 | 4:25 | 4:30 |
| 1 | 1 | 9 | 4:45 | 4:50 |
| ⋮ | | | | |
| 2 | 1 | 2 | 6:00 | 7:00 |
| 2 | 1 | 8 | 7:50 | 8:00 |
| ⋮ | | 3 | 8:12 | 8:17 |
| ⋮ | | | | |

FIG. 5

| PACKAGE DATA | DELIVERY DATE | POINT | DELIVERY TIME ZONE | VOLUME | WEIGHT | UNLOADING TIME | PACKAGE FORM | PACKAGE TYPE | SHIPPER | WEEKDAY /HOLIDAY | SEASON | PEAK SEASON |
|---|---|---|---|---|---|---|---|---|---|---|---|---|
| 1 | 2020/4/1 | 1 | 12:00-14:00 | 0.1 | 0.001 | 5 | BOX | NORMAL | ○○ | WEEKDAY | SPRING | NORMAL |
| 2 | 2020/4/1 | 5 | 7:00-12:00 | 0.3 | 0.02 | 10 | BOX | NORMAL | △△ | WEEKDAY | WINTER | CHRISTMAS |
| 3 | 2020/4/1 | 17 | 9:00-14:00 | 0.5 | 0.1 | 5 | IRREGULAR | FROZEN | ○△ | HOLIDAY | SUMMER | NORMAL |
| 4 | 2020/4/1 | 17 | 9:00-14:00 | 0.5 | 0.1 | 5 | BOX | NORMAL | ○△ | WEEKDAY | SUMMER | OBON |
| ... | | | | | | | | | | | | |

INFORMATION PROCESSING APPARATUS, INFORMATION PROCESSING SYSTEM, INFORMATION PROCESSING METHOD, INFORMATION PROCESSING PROGRAM, AND DISPLAY DEVICE

CROSS REFERENCE TO RELATED APPLICATIONS

This application is based upon and claims the benefit of priority from the prior Japanese Patent Application No. 2020-031971, filed on Feb. 27, 2020, the entire contents of which are incorporated herein by reference.

FIELD

Embodiments described herein relate to an information processing apparatus, an information processing system, an information processing method, an information processing program, and a display device.

BACKGROUND

It is required to easily create a package delivery plan to deliver packages to the respective delivery destinations.

BRIEF DESCRIPTION OF THE DRAWINGS

FIG. 2 is a diagram illustrating an example of package historical data according to the embodiment;

FIG. 3 is a diagram illustrating an example of track data according to the embodiment;

FIG. 4 is a diagram illustrating an example of inter-point distance time data according to the embodiment;

FIG. 5 is a diagram illustrating an example of a delivery plan according to the embodiment;

FIG. 11 is a diagram illustrating an example of package data according to the embodiment;

DETAILED DESCRIPTION OF THE INVENTION

According to one embodiment, an information processing apparatus according to an embodiment includes an extractor 7 configured to extract a representative point that appears at a rate higher than or equal to a predetermined appearance rate, based on a point included in package historical data recorded when a package is delivered and a delivery plan creator 8 configured to create a first delivery plan with respect to the representative point.

Embodiments will be described below with reference to the drawings.

First Embodiment

Figure 1:
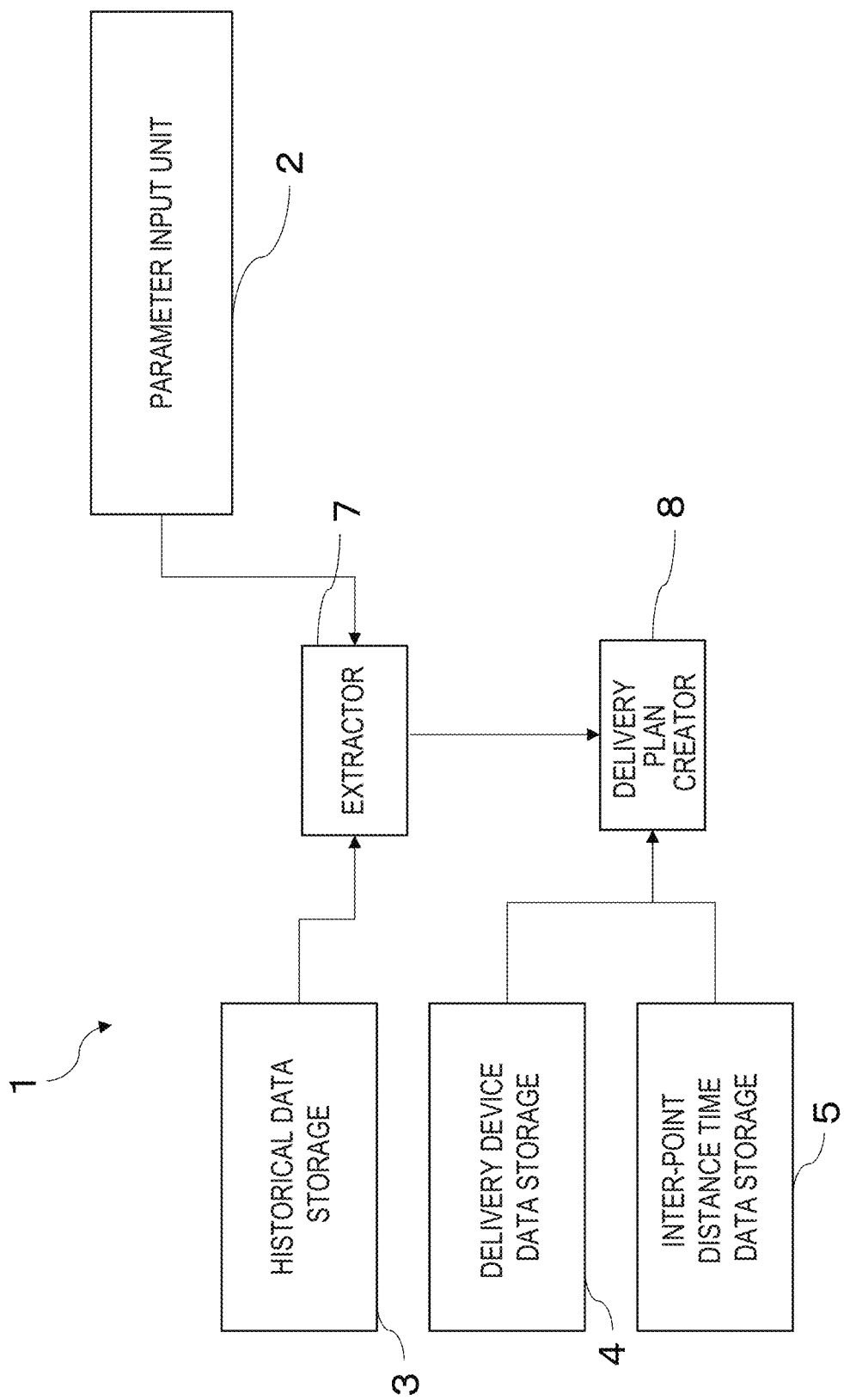
FIG. 1 is a schematic diagram of a delivery planning system according to a first embodiment.

FIG. 1 is a schematic diagram of a delivery planning system 1 according to a first embodiment.

The delivery planning system 1 includes a parameter input unit 2, a historical data storage 3, a delivery device data storage 4, an inter-point distance time data storage 5, an extractor 7, and a delivery plan creator 8, and can easily create a delivery plan for any package. It is assumed that the delivery plan created in the first embodiment is a plan for regular delivery (regular delivery plan).

Package characteristic parameters are input by a user to the parameter input unit 2. The package characteristic parameters include, for example, a delivery date, a delivery time zone, a package volume, a package weight, an unloading time, a package form, a package type, a shipper, a weekday/holiday, a season, and a peak season.

The historical data storage 3 stores package historical data recorded at the time of deliveries in the past. The package historical data is data including a point that is a delivery destination to which a package was delivered and parameter information about the characteristics of packages delivered in the past. FIG. 2 is a diagram illustrating an example of the package historical data. As illustrated in FIG. 2, for example, in the case of package historical data 1, information that the point is "1", the delivery date is "2019/4/3", the delivery time zone is "12:00-14:00", the volume is "0.1", the weight is "0.001", the unloading time is "5", the package form is "box", the package type is "normal", the shipper is "○○", the weekday/holiday is "weekday", the season is "spring", and the peak season is "normal" is associated with the package historical data 1. In this way, the historical data of each package is associated with each point and the parameter information about the characteristics of each package and then is stored in the historical data storage 3.

The delivery device data storage 4 stores delivery device data about the characteristics of a delivery device. The delivery device is, for example, a vehicle such as a truck, an airplane, an automated guided vehicle, or the like. The delivery device data storage 4 acquires delivery device data from a delivery company, a delivery device manufacturer, or the like in advance and stores the delivery device data. The delivery device data is data relating to delivery restrictions and delivery costs. Delivery restrictions are restrictions that take into account the characteristics of packages and the characteristics of delivery devices (for example, volume of package to be delivered is less than or equal to maximum capacity of delivery device or when package type is frozen package, truck type is refrigerated vehicle, and the like) and restrictions that take into account the burden on the driver of a delivery device. The delivery cost is a cost required to deliver a package. In the present embodiment, the delivery device is a truck and the delivery device data is track data. The track data is associated with information such as a truck type, a maximum volume, a maximum capacity, a regular truck fee, a charter truck fee, the number of regular trucks, and the number of charter trucks. In the track data, the truck type, the maximum volume, and the maximum capacity are related to the delivery restrictions, whereas the regular truck fee, the charter truck fee, the number of regular trucks, and the number of charter trucks are related to the delivery costs.

The regular truck fee is the fee required to rent trucks on a regular basis, and the charter truck fee is the fee required to occasionally rent trucks when the number of packages increases suddenly and regular trucks cannot afford to deliver such packages. If the company owns trucks, the track data does not include information about the charter truck fee, the number of regular trucks, and the number of charter trucks, but includes a maintenance fee such as a gasoline cost. This maintenance fee relates to the delivery costs. FIG. 3 is a diagram illustrating an example of the track data. As illustrated in FIG. 3, for example, in the case of track data 1, information that the truck type is "2 t truck", the maximum volume is "12", the maximum capacity is "2000", the regular truck fee is "3000", the charter truck fee is "4000", the number of regular trucks is "10", and the number of charter trucks is "1" is associated with the track data 1. In this way, the information such as the truck type, the maximum volume, the maximum capacity, the regular truck fee, the charter truck fee, the number of regular trucks, and the number of charter trucks is associated with each track data, and is then stored.

The inter-point distance time data storage 5 stores in advance inter-point distance time data including a plurality of points, a distance between two points, that is, from a certain point to another point among the points, and a time taken for a delivery device to perform a delivery for the distance between the two points, that is, from a certain point to another point. FIG. 4 is a diagram illustrating an example of the inter-point distance time data. As illustrated in FIG. 4, for example, in the case of inter-point distance data 1, information that the points are "1" and "2", the distance from the point 1 to the point 2 is "12.34", and the time taken for a delivery device to perform a delivery is "3.5" is associated with the inter-point distance data 1. In this way, each point, the distance from a certain point to another point, and the time taken for delivery are associated with each inter-point distance data and are then stored.

The extractor 7 acquires, from the historical data storage 3, the package historical data corresponding to the package characteristic parameters input by a user to the parameter input unit 2, and extracts a plurality of pieces of package historical data including points having an appearance rate higher than or equal to a predetermined appearance rate from the package historical data acquired. The point having an appearance rate higher than or equal to the predetermined appearance rate is determined as a representative point. As the appearance rate, a value input by the user from the parameter input unit 2 may be used, or a fixed value such as 50% or higher may be used. Alternatively, the extractor 7 may extract the representative point so that the number of extracted representative points and the number of deliveries (number obtained by counting as 1 at the same point) are equal to the number of representative points to which deliveries are made in a day and the number of deliveries made in a day in the package historical data, respectively. Based on a plurality of pieces of the package historical data extracted, the representative point is associated with the package characteristic parameters. When all the package characteristic parameter information included in a plurality of pieces of the package historical data extracted is the same, one of the package characteristic parameters extracted is used as the package characteristic parameter to be associated with the representative point. When the package characteristic parameters are different, the package characteristic parameter is virtually set and associated with the representative point. In the virtually setting method, among package characteristic parameters, parameters in which average values can be used such as a package volume and a package weight adopt the average values, whereas the most frequent information in the package historical data extracted is set as parameters in which average values cannot be used such as a shipper and a package. In another example, an arrival time zone, a volume, a weight, and an unloading time may be virtually set to 0, and average values calculated from other packages may be set. A package form, a package type, and a shipper do not need to be specified. Further, in the case of the package volume and the package weight, a value obtained by multiplying the average value by a load adjustment coefficient that is a user input value from the parameter input unit 2 may be used. The load adjustment coefficient is a coefficient set by the user on the assumption that the load will increase or decrease in the future. As the load adjustment coefficient, a coefficient obtained by predicting that the load is increasing or decreasing in time series from the package historical data extracted by the extractor 7 and estimating the future load may be used. For example, in the case of the package volume, the average value of the package volume included in each representative point for the entire period is calculated, and the sum of the average values of the package volume at the respective representative points is denoted by "a". The average value of the package volume included in each representative point in the latest day is calculated, and the sum of the average values of the package volume at the respective representative points is denoted by "b". The load adjustment coefficient is thus denoted by "a/b". A value obtained by multiplying the average value of the package volume at each representative point by the load adjustment coefficient may be used.

The delivery plan creator 8 creates a delivery plan based on the track data stored in the delivery device data storage 4, the inter-point distance time data stored in the inter-point distance time data storage 5, and the representative point extracted by the extractor 7. This delivery plan does not include points other than the representative point, and is created for the representative point. As the delivery plan is created for the representative point, it is possible to create a regular delivery plan that corresponds only to a regular delivery. By performing daily deliveries based on this regular delivery plan, the burden on a driver can be reduced, for example, the route to a delivery destination can be fixed, the place where a truck stops at the delivery destination can be fixed, and unloading at the delivery destination becomes easy. FIG. 5 is a diagram illustrating an example of a delivery plan created by the delivery plan creator 8. The delivery plan is associated with information such as track data, a representative point, an arrival time, and a departure time. The arrival time and the departure time can be calculated from the inter-point distance time data. As illustrated in FIG. 5, for example, in the case of a delivery plan 1, as a result of optimization in view of delivery restrictions and delivery costs, track data "1" is selected and a delivery is performed in the delivery order of representative points 1, 7, and 9. This optimization method will be described later.

Figure 6:
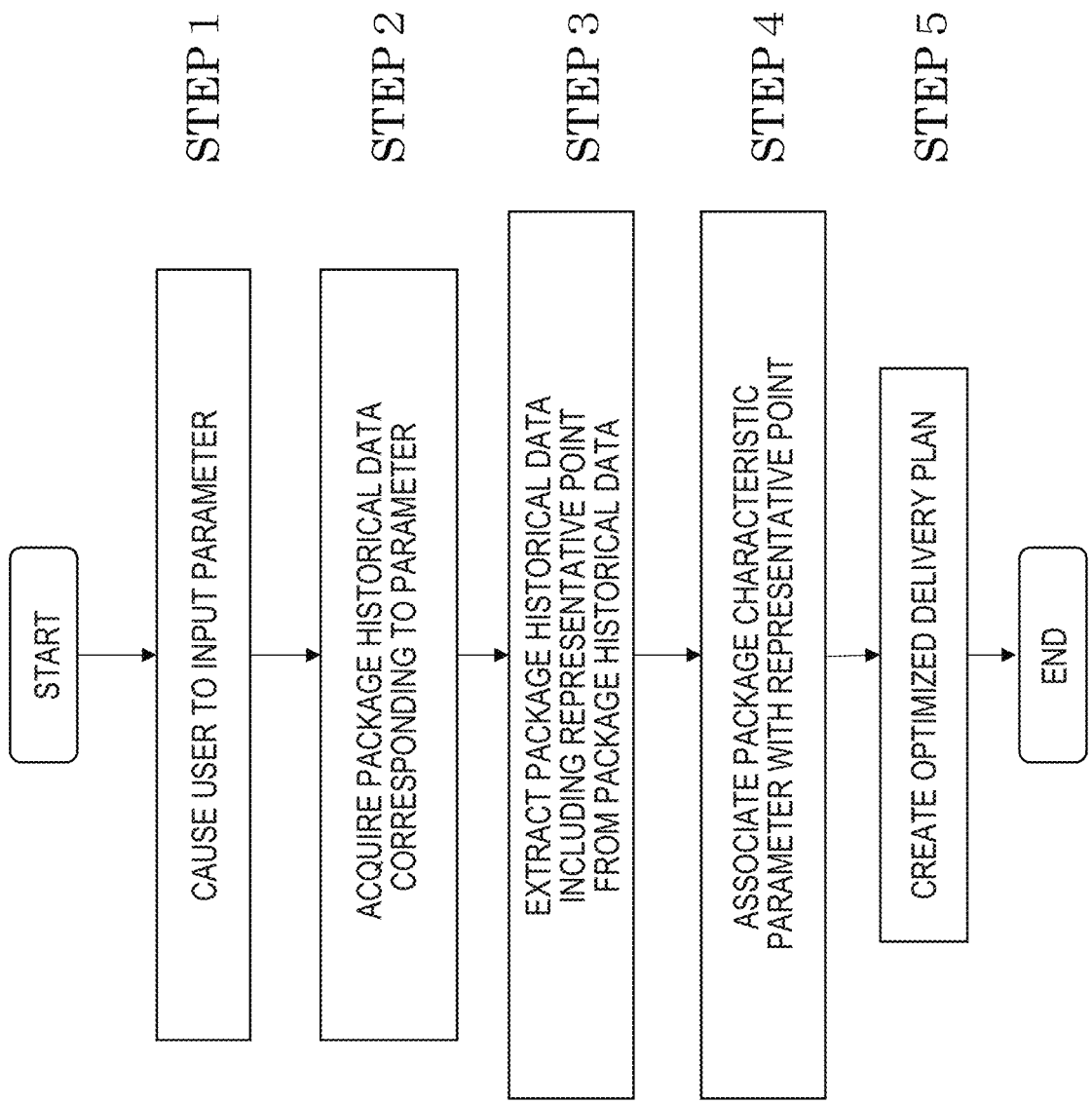
FIG. 6 is a flowchart for creating a delivery plan according to the embodiment.

FIG. 6 is a flowchart for creating a delivery plan according to the embodiment.

A user inputs a package characteristic parameter to the parameter input unit 2 (STEP 1).

The extractor 7 acquires the corresponding package historical data from the historical data storage 3 based on the package characteristic parameter input from the parameter input unit 2 (STEP 2). For example, when the input parameters are those in the period from November to January, the extractor 7 acquires the package historical data corresponding to the period from November to January. Alternatively, when the input parameter is only a package type "frozen delivery", the extractor 7 acquires the package historical data corresponding only to the frozen delivery. Further, it is also possible to acquire the package historical data by combining the parameters. For example, when the package characteristic parameters having been input are a period and a package type, the package historical data corresponding to the period and the package type can be acquired.

The extractor 7 extracts a plurality of pieces of package historical data including a representative point from the package historical data acquired (STEP 3). For example, a point having an appearance rate higher than or equal to a predetermined appearance rate is selected as the representative point from the package historical data acquired.

The extractor 7 associates the package characteristic parameter with the representative point based on a plurality of pieces of the package historical data including the representative point (STEP 4). For example, when all the package characteristic parameter information included in the package historical data including the extracted representative point is the same, one of the package characteristic parameters extracted is used as the package characteristic parameter to be associated with the representative point. When the package characteristic parameters are different, the package characteristic parameter is virtually set and associated with the representative point. When the package characteristic parameter is associated with the representative point using the load adjustment coefficient, the user inputs the load adjustment coefficient to the parameter input unit 2 when associating the package characteristic parameter with the representative point.

The delivery plan creator 8 creates an optimized delivery plan based on the delivery device data stored in the delivery device data storage 4, the inter-point distance time data stored in the inter-point distance time data storage 5, and the representative point extracted by the extractor 7 (STEP 5). The delivery plan creator 8 calculates a total delivery distance and a total delivery time in the delivery plan based on the departure time and arrival time calculated from the inter-point distance data. The delivery plan creator 8 creates a delivery plan in view of the burden on the driver of a delivery device, based on the total delivery distance and the total delivery time. Further, the delivery plan creator 8 sets delivery devices that can be used in creating a delivery plan is created based on the delivery device data, and calculates restrictions on packages to be loaded on each delivery device, restrictions on volume and capacity, and delivery fees. This makes it possible to calculate delivery restrictions and delivery costs (total delivery distance, total delivery time, and delivery fee), and thus optimization is possible so as to meet the delivery restrictions and minimize the delivery costs (total delivery distance, total delivery time, and delivery fee). This is optimization as to which package is delivered by which delivery device in which order in order to meet the delivery restrictions and minimize the delivery costs (total delivery distance, total delivery time, and delivery fee). Various methods are known as such optimization. For example, such optimization methods include rule-based solution construction methods (greedy method and neighborhood search method), genetic algorithm (GA), simulated annealing (SA), enumeration-based search, and optimization methods using quantum annealing and Ising machine in which formulation is performed by mixed integer linear programming and a solution is found with a general-purpose solver.

At this time, two objective functions, that is, an objective function f(x) that minimizes the delivery costs (total delivery distance, total delivery time, and delivery fee) and an objective function g(x) that maximizes the number of packages in each delivery device, the number of transfers, and all or some of the numbers of appearances of each package in the past data may be optimized. These two objective functions may be linearly combined using a real coefficient $d(d<=1)$, so that $h(x)=d \times f(x)-(1-d) \times g(x)$ is derived where h(x) is minimized (or −h(x) is maximized). Alternatively, in a method of performing sequential optimization such as neighborhood search, after f(x) is optimized, the objective function is changed and then g(x) may be optimized.

The delivery planning system 1 according to the first embodiment includes the parameter input unit 2, the historical data storage 3, the delivery device data storage 4, the inter-point distance time data storage 5, the extractor 7, and the delivery plan creator 8, and can easily create a package delivery plan.

While the package historical data includes parameter information about a point and the characteristics of a package in the present embodiment, it is only required that at least information about the point is provided. While the point includes information such as a name of a point, an address of a point, a latitude, a longitude, and a customer flag, it is only required that at least information about the latitude and longitude is provided.

The parameter input unit 2 is not always necessary unlike the example of FIG. 1. If the parameter input unit 2 is not provided, the representative point extractor 7 may extract representative points from all the package historical data stored in the historical data storage 3.

The inter-point distance time data does not need to be stored in the historical data storage 3 in advance. For example, as for a plurality of points, the inter-point distance time data storage 5 may acquire points included in the package historical data from the historical data storage 3. The inter-point distance time data storage 5 may calculate the distance between two points, that is, from a certain point to another point from the points. Further, the inter-point distance time data storage 5 may calculate the time taken for a delivery device to perform a delivery for the distance between two points, that is, from a certain point to another point from the distance and the characteristics of the delivery device, and may store these values.

Second Embodiment

Only the parts different from the first embodiment will be described.

Figure 7:
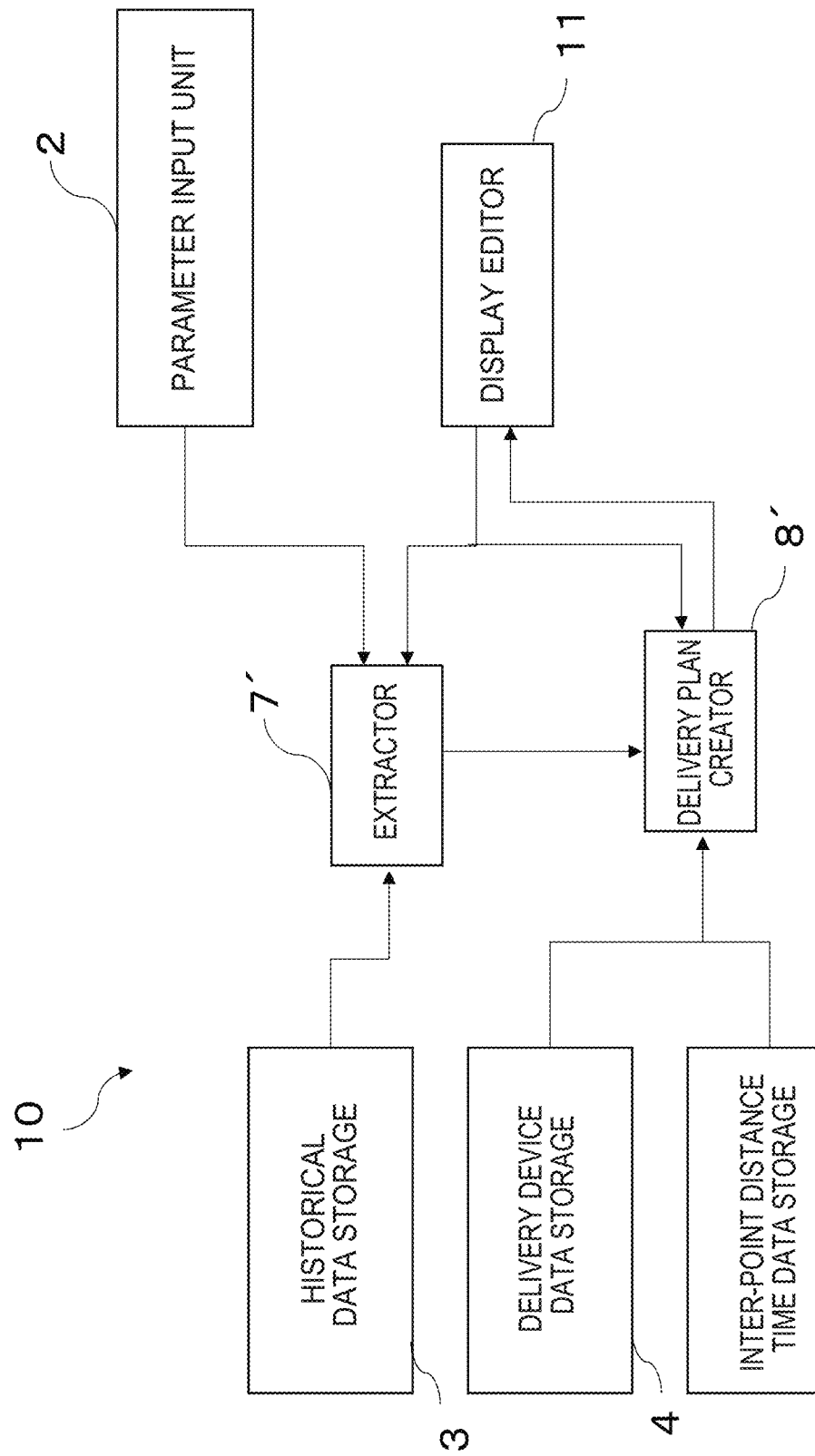
FIG. 7 is a schematic diagram of a delivery planning system according to a second embodiment.

FIG. 7 is a schematic diagram of a delivery planning system 10 according to a second embodiment.

As illustrated in FIG. 7, the delivery planning system 10 according to the second embodiment includes a display editor 11 (also referred to as "processor") capable of displaying and editing a delivery plan in the delivery planning system 1 according to the first embodiment. As the display editor 11 is included, a user can edit a delivery plan in addition to the function of displaying the delivery plan created by the delivery planning system 1 according to the first embodiment.

Figure 8:
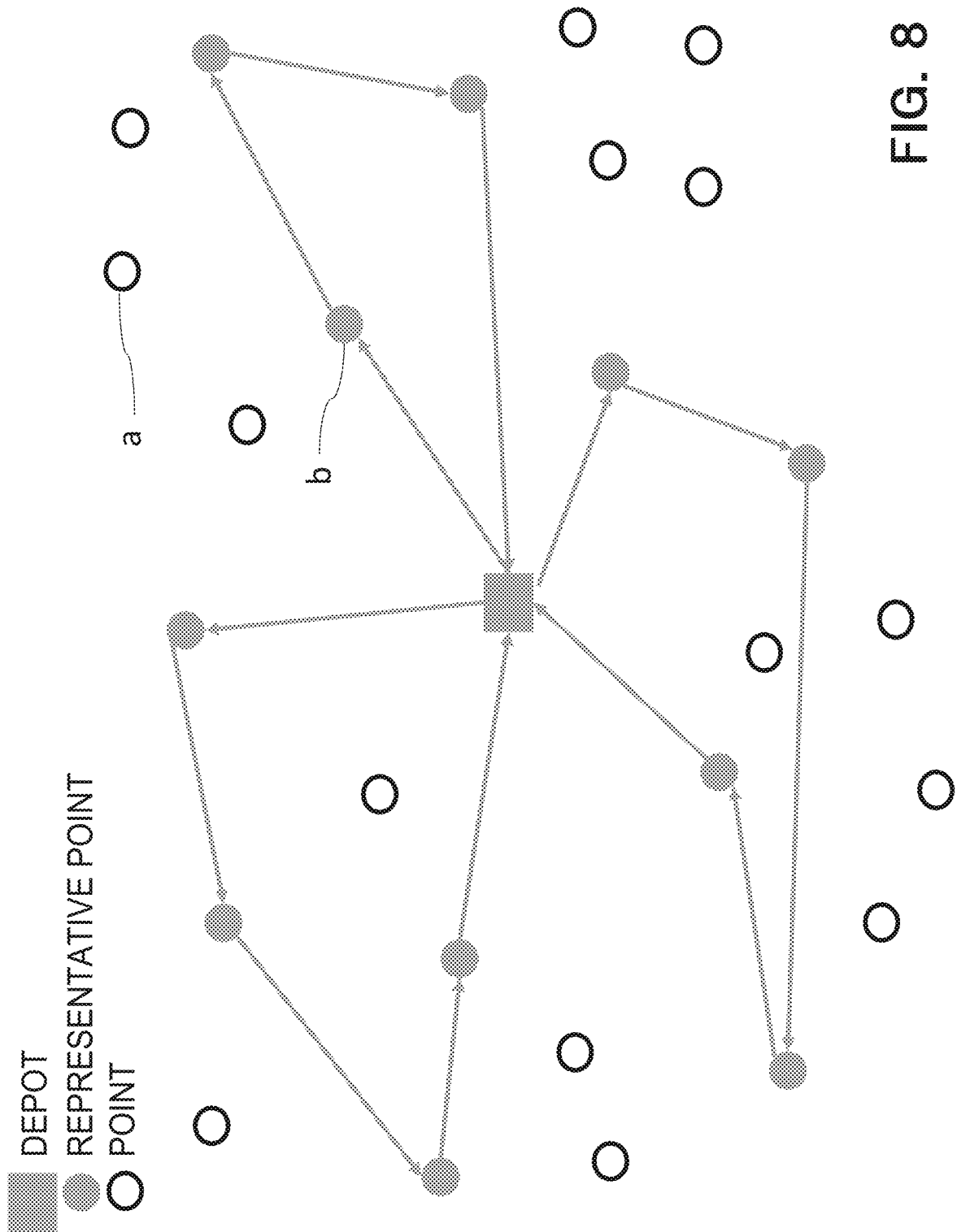
FIG. 8 is a diagram illustrating an example in which a delivery plan is displayed on a map.
Figure 9:
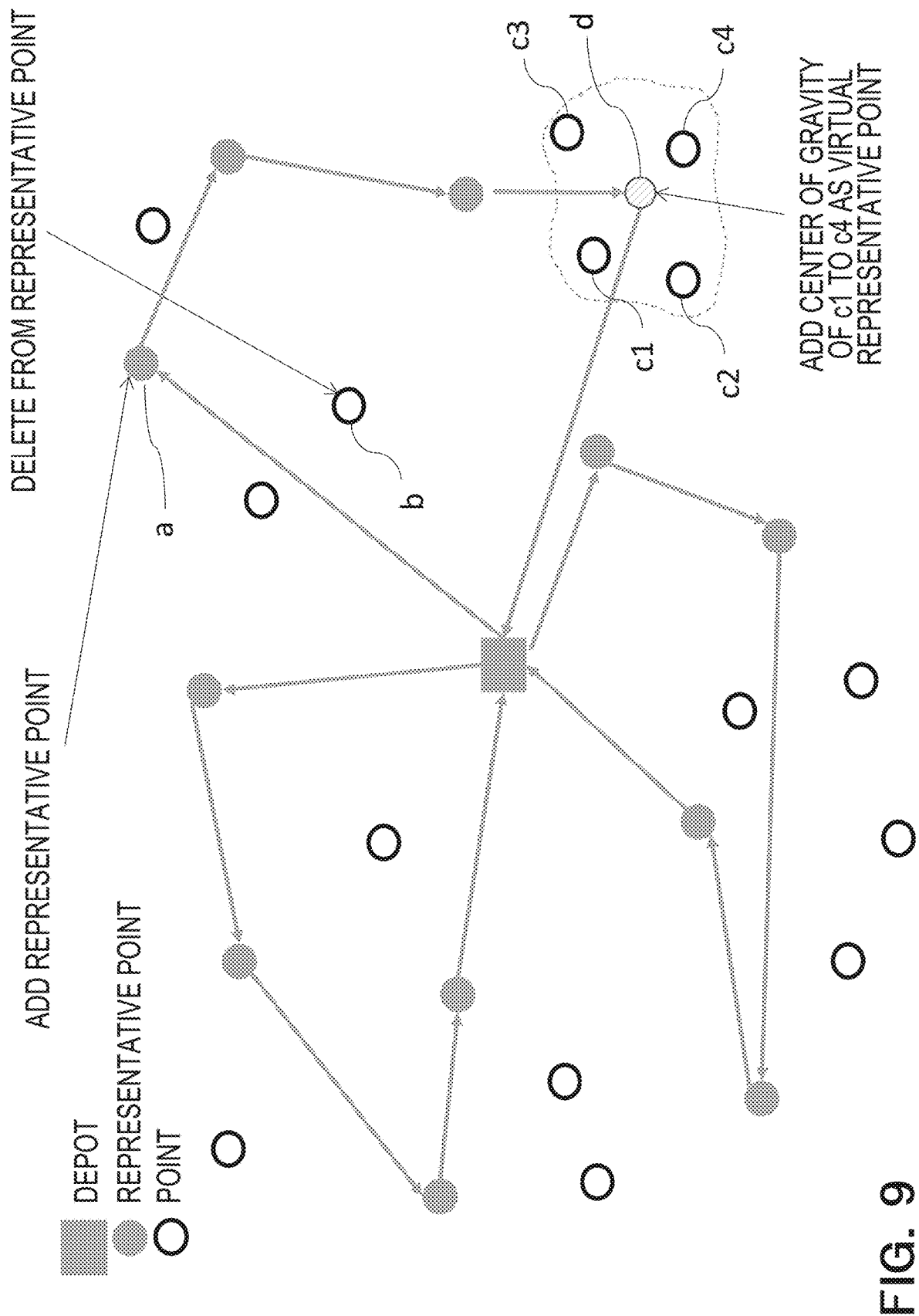
FIG. 9 is a diagram illustrating an example in which an edited delivery plan is displayed on a map.

The display editor 11 has a function of allowing the user to edit a delivery plan in addition to the function of displaying the delivery plan on its screen. The display editor 11 is, for example, a display device (PC, smartphone, car navigation system, or the like) mounted on a delivery device. Editing includes, for example, addition and deletion. In displaying a delivery plan on the screen of a PC, a smartphone, a car navigation system, or the like, the display editor 11 acquires information about a point and GIS data in advance, and displays the delivery plan on the screen based on the point and the GIS data. The GIS data is geographic information system (GIS) data, and represents information indicating the position of a specific point or a specific area in space (positional information) and information about various events related to the positional information, or information consisting only of the position information. That is, the GIS data is information about maps. Consequently, the display editor 11 acquires the point and the GIS data, thus displaying representative points included in the delivery plan on a map, as illustrated in FIG. 8. A depot in FIG. 8 indicates a starting point of delivery. The user can add or delete the representative points on this map. When the representative point is added (for example, in case where point, which is customer, is not extracted as representative point, but it is scheduled to perform regular deliveries to this point in future and thus this point is desired to be added), the user specifies a point to be add to the representative points on the screen, and the display editor 11 transmits the point to an extractor 7'. The extractor 7' searches for the package historical data including the same point as the transmitted point. If there is at least one piece of the package historical data including the same point as the transmitted point, the transmitted point is set as the representative point, and the representative point is associated with package characteristic parameters by the method described above. If there is no package historical data including the same point as the transmitted point, the transmitted point is set as the representative point, and the representative point is virtually associated with the package characteristic parameters where an arrival time zone, a volume, a weight, and an unloading time are set to 0, and a package form, a package type, and a shipper are not specified. That is, the added representative point may be a point different from the point recorded when a package was delivered in the past. It is also possible for the user to specify a plurality of points, create a virtual representative point at the center of gravity of these points on the map, and add the virtual representative point. The virtual representative point is virtually associated with the package characteristic parameters by the method described above. The added representative point is transmitted from the extractor 7' to a delivery plan creator 8'. The delivery plan creator 8' creates a delivery plan including the representative points transmitted by the method described above. When the representative point is deleted (for example, in case where point is extracted as representative point, but is desired to be deleted because transaction has ended), a command to delete the representative point is transmitted to the delivery plan creator 8', and the delivery plan creator 8' creates a delivery plan with the representative point deleted. That is, the delivery plan creator 8' edits a delivery plan based on a user's specification and transmits the edited delivery plan to the display editor 11. The display editor 11 displays the edited delivery plan. FIG. 9 is a diagram illustrating a screen displaying a delivery plan obtained by editing the delivery plan illustrated in FIG. 8. In FIG. 8, a point (a) is not the representative point and a point (b) is the representative point. However, as illustrated in FIG. 9, a delivery plan in which the point (a) is added as the representative point a and the point (b) is deleted from the representative point by a user's specification is displayed. In addition, the delivery plan is displayed in which the user specifies a plurality of points (c1 to c4) and a point (d) functioning as the center of gravity of the points (c1 to c4) is added as a virtual representative point.

The delivery planning system 10 according to the second embodiment includes a display editor in the delivery planning system 1 according to the first embodiment. Consequently, in addition to the effects of the delivery planning system 1 according to the first embodiment, the user can edit a delivery plan and display an edited delivery plan.

Unlike the examples of FIGS. 8 and 9, the order of tour may be indicated on a map by numbers or the like.

Third Embodiment

Only the parts different from the first embodiment will be described.

Figure 10:
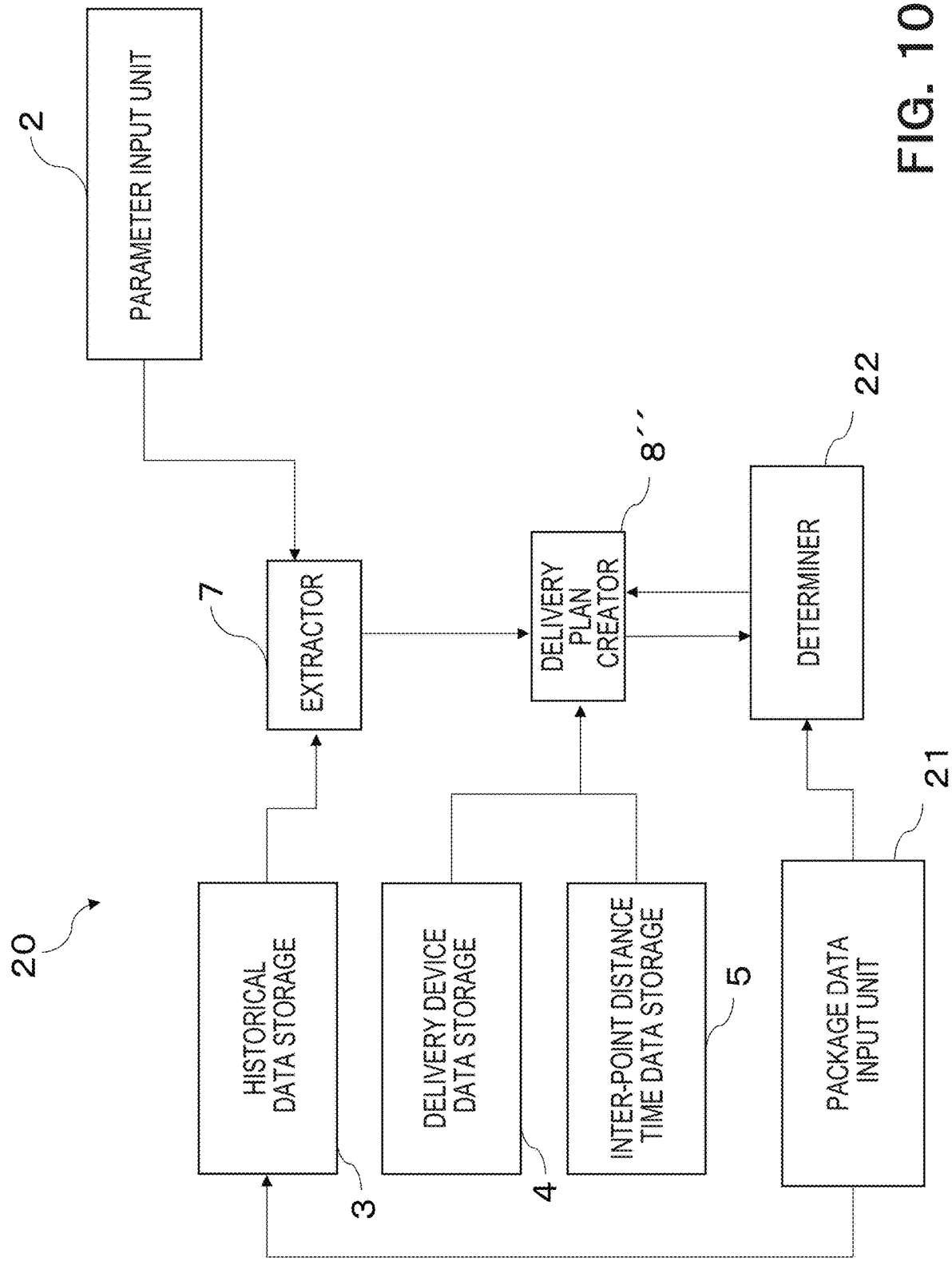
FIG. 10 is a schematic diagram of a delivery planning system according to a third embodiment.

FIG. 10 is a schematic diagram of a delivery planning system 20 according to a third embodiment.

As illustrated in FIG. 10, the delivery planning system 20 according to the third embodiment includes a package data input unit 21 and a determiner 22 in the delivery planning system 1 according to the first embodiment. Consequently, the delivery planning system 20 can create a delivery plan for a planning target day, the delivery plan supporting not only regular deliveries but also deliveries to points other than representative points. While the planning target day is described on a day basis, the planning target day is not necessarily a day, and a delivery plan may be created on an hourly basis or on a second basis. While the term "planning target day" is used in the present embodiment, the planning target day can be replaced by "planning target period" including a day unit, an hour unit, a second unit, and the like.

Data of packages to be delivered on a planning target day (hereinafter, also referred to as "package data") is input to the package data input unit 21. This package data is data in the same format as the package historical data, and includes a point and package characteristic parameter information. FIG. 11 is a diagram illustrating an example of the package data. As illustrated in FIG. 11, for example, in the case of package data 1, information that the delivery date is "2020/4/1", the point is "1", the delivery time zone is "12:00-14:00", the volume is "0.1", the weight is "0.001", the unloading time is "5", the package form is "box", the package type is "normal", the shipper is "○○", the weekday/holiday is "weekday", the season is "spring", and the peak season is "normal" is associated with the package data 1. FIG. 11 illustrates that the planning target day is 2020/4/1. The package data is input from the package data input unit 21, and then transmitted to the determiner 22 and the historical data storage 3. The package data transmitted to the historical data storage 3 becomes the historical data of the package delivered in the past, and is stored in the historical data storage 3.

The determiner 22 acquires the package data transmitted from the package data input unit 21 and the delivery plan according to the first embodiment. The determiner 22 compares the point included in the package data with the representative point included in the delivery plan, and if the point included in the package data is the same as the representative point, determines as the package data including the point matching the representative point. In this way, it is determined whether or not the points included in all the package data match the representative point. If there is a delivery plan that includes the representative point matching the point included in the package data, package characteristic parameters included in the representative point in the delivery plan are replaced by package characteristic parameters included in the package data, so that the delivery plan is revised. The package data determined not to match the representative point is stored as a list. In addition, if there is a delivery plan that includes a representative point that does not match the point included in the package data, the delivery plan is deleted. The determiner 22 transmits the revised delivery plan and a package data list again to a delivery plan creator 8".

The delivery plan creator 8" inserts the package data list into the revised delivery plan to create a delivery plan for a planning target day. In inserting the package data list into the revised delivery plan, for example, when a point included in the package data list is present between a representative point 1 and a representative point 2 that are included in the revised delivery plan, the package data may be inserted between a delivery plan including the representative point 1 and a delivery plan including the representative point 2. In addition, when the package data list cannot be inserted into the revised delivery plan due to delivery restrictions, a new delivery plan is added. As a more specific example, based on the revised delivery plan and the package data list, a piece of package data is inserted before a first delivery plan and the increment of the delivery cost is calculated, and then the package data is inserted before the next delivery plan (between first delivery plan and second delivery plan) and the increment of the delivery cost is calculated. The package data list is inserted before the optimal revised delivery plan among all the revised delivery plans. The delivery plan creator 8" inserts the package data list before the optimal revised delivery plan by the optimization method described above. The total of delivery plans for a planning target day is more than or equal to the total of delivery plans. Consequently, the delivery plan for a planning target day meets the delivery restrictions and minimizes the delivery costs (total delivery distance, total delivery time, and delivery fees).

The delivery planning system 20 according to the third embodiment includes the package data input unit 21 and the determiner 22 in the delivery planning system 1 according to the first embodiment. Consequently, in addition to the effects of the delivery planning system 1 according to the first embodiment, it is possible to create a delivery plan for a planning target day without significantly changing a delivery plan in situations where in practice, delivery destinations differ daily.

Figure 12:
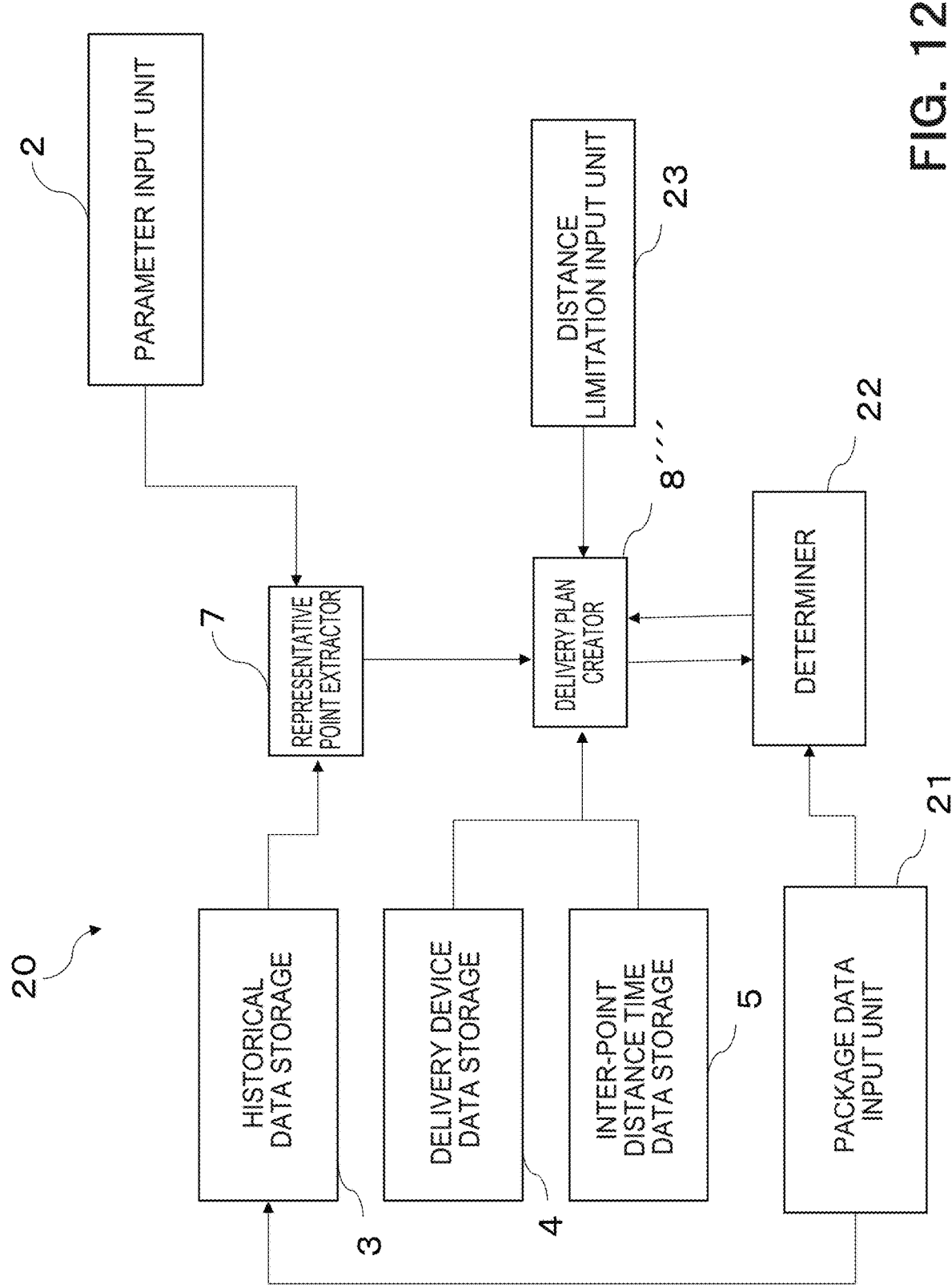
FIG. 12 is a diagram illustrating a modification of the delivery planning system according to the third embodiment.

Further, as illustrated in FIG. 12, a distance limitation input unit 23 that limits a driver travel distance may be further provided in FIG. 10. For example, the upper limit value of the driver travel distance is input to the distance limitation input unit 23, and the upper limit value is acquired by a delivery plan creator 8'". The delivery plan creator 8'" creates a delivery plan in view of the load on the driver when creating a delivery plan.

Fourth Embodiment

Only the parts different from the first embodiment, the second embodiment, and the third embodiment will be described.

Figure 13:
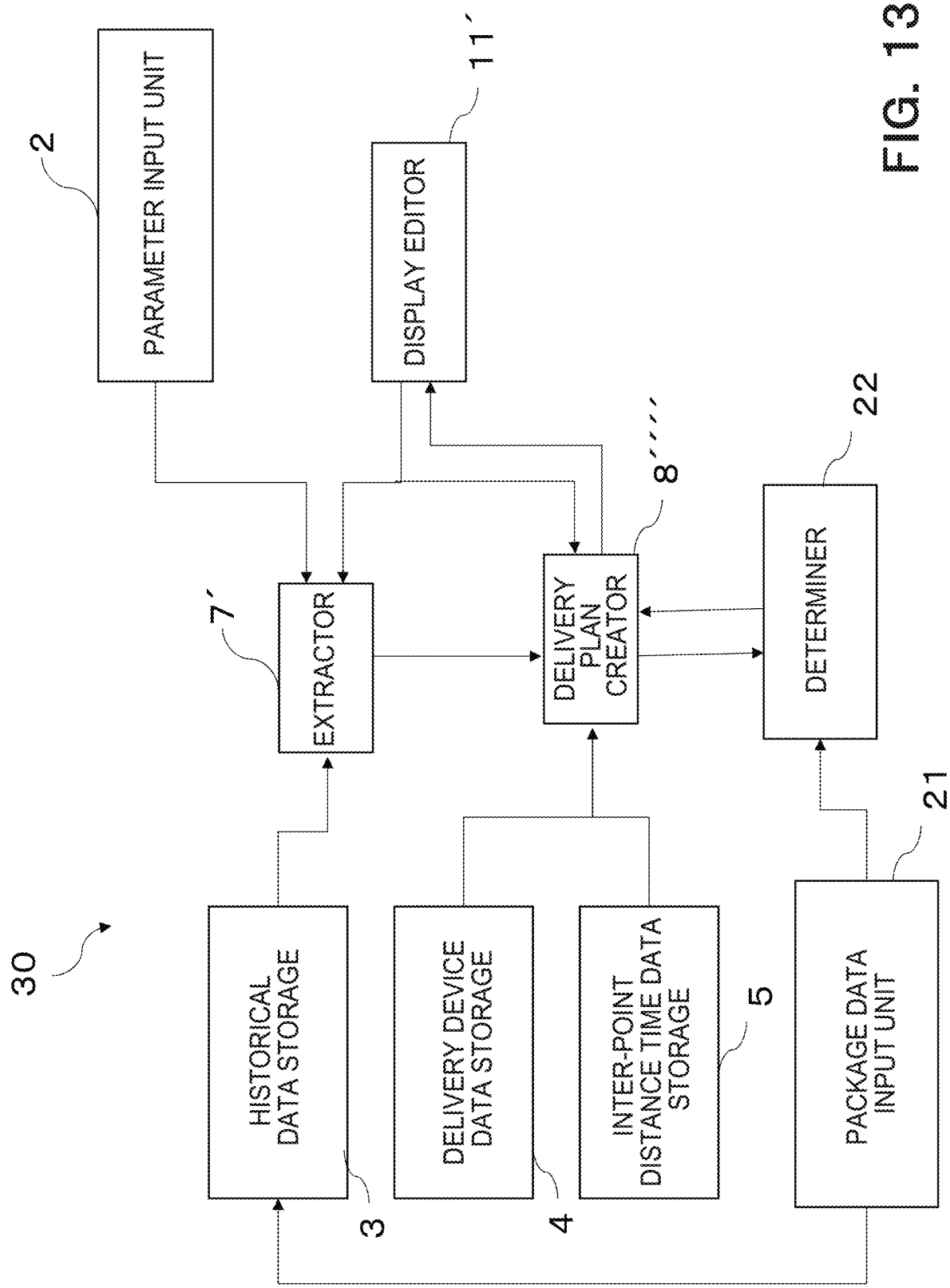
FIG. 13 is a schematic diagram of a delivery planning system according to a fourth embodiment.

FIG. 13 is a schematic diagram of a delivery planning system 30 according to a fourth embodiment.

As illustrated in FIG. 13, in the delivery planning system 30 according to the fourth embodiment, a display editor 11' can display a delivery plan and a delivery plan for a planning target day created based on the delivery plan on its screen.

Figure 14:
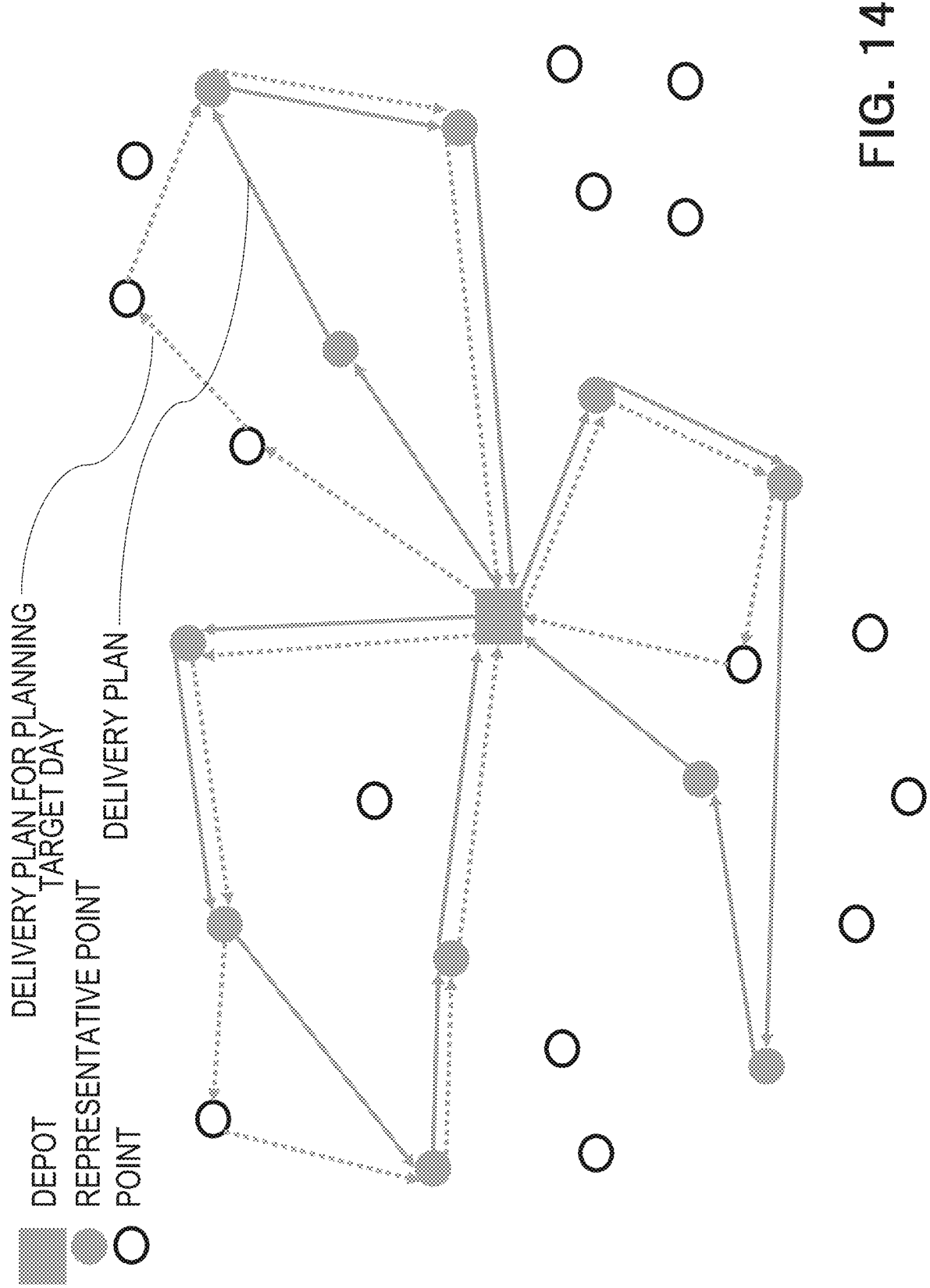
FIG. 14 is a diagram illustrating an example in which a delivery plan and a delivery plan for a planning target day are displayed on a map according to an embodiment.

The display editor 11' acquires the delivery plan according to the second embodiment and the delivery plan for a planning target day according to the third embodiment from a delivery plan creator 8"". The display editor 11' displays each delivery plan on a map based on the delivery order of each delivery plan, points included in each delivery plan, and GIS data. As a display method, as illustrated in FIG. 14, the delivery plan is displayed as a solid line and the delivery plan for a planning target day is displayed as a dotted line. While the delivery plan according to the second embodiment and the delivery plan for a planning target day according to the third embodiment are displayed in FIG. 14, a user may specify one of them and only the specified delivery plan may be displayed.

The delivery planning system 40 according to the fourth embodiment can display a delivery plan and a delivery plan for a planning target day on the screen of a PC, a smartphone, a car navigation system, or the like so as to visually recognize the delivery plans, in addition to the effects of the delivery planning system 1 according to the first embodiment, the delivery planning system 10 according to the second embodiment, and the delivery planning system 30 according to the third embodiment.

At least a part of the embodiments described above may be implemented by a dedicated electronic circuit (that is, hardware) such as an integrated circuit (IC) on which a processor, a memory and the like are mounted. Further, at least a part of the embodiments described above may be achieved by executing software (program). For example, by using a general-purpose computer device as basic hardware and causing a processor such as a CPU mounted on the computer device to execute the program, the processing in the embodiments described above can be implemented.

For example, as the computer reads dedicated software stored in a computer-readable storage medium, the computer can be the device in the embodiments described above. The type of the storage medium is not particularly limited. Further, as the computer installs dedicated software downloaded via a communication network, the computer can be the device in the embodiments described above. In this way, information processing by software is specifically implemented using hardware resources.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus comprising:
   a first hardware storage configured to store package historical data recorded when packages are delivered by a delivery device, the package historical data including points where the packages were delivered and parameters related to the characteristics of the packages;
   a parameter input circuit configured to receive parameters input from a user, including a historical period or package characteristics to be used for designing a route of a regular delivery;
   processing circuitry configured to
      selecting from the first hardware storage the package historical data that matches the user-input parameters, extract representative points that appear at a rate higher than or equal to a predetermined appearance rate, based on the selected package historical data, and set, for each of the extracted representative points, the parameter related to the characteristics of the package included in one of the package historical data which includes the representative point or a parameter related to characteristics of a package which is virtually generated from the parameters related to the characteristics of the packages in the past historical data that includes the representative point;

a second hardware storage configured to store delivery device data indicating characteristics of a plurality of delivery devices, including types, capacities, and usage fees of the delivery devices, respectively, of the plurality of delivery devices; and a third hardware storage configured to store inter-point distance time data that includes a distance between any two points and a time taken to perform a delivery for the distance between the any two points, a first delivery plan including an order of delivery of the representative points where the packages are delivered;

wherein the processing circuitry solves an optimization problem, based on the delivery device data and the inter-point distance time data, to meet an optimization criteria of total delivery distance and delivery cost, to result in selecting one of the delivery devices, and determining an order of delivery of the extracted representative points and arrival times and departure times at the extracted representative point, and generates the first delivery plan by allocating the parameters related the characteristics of the packages which is set for the extracted representative points parameters, the first delivery plan being for each days in a future period corresponding to the historical period or the first delivery plan being a deliver plan per day for packages with same characteristics as the package characteristics to be used for designing the route of the regular deliver inputted by the user, and the first delivery plan does not include any points other than the extracted representative points.

2. The information processing apparatus according to claim 1, wherein the input circuitry is configured to receive package data, including points to which packages are to be delivered during a planning target day and parameters related to package characteristics of the packages which are to be delivered to the points, wherein:
the processing circuitry detects whether each of the points included in the package data received in the input circuitry matches any one of the representative points in the first delivery plan,
if each of the points included in the package data matches any one of the representative points in the first delivery plan, the processing circuitry modifies the first delivery plan by replacing the parameter which has been set for the matched one of representative points in the first delivery plan, with the parameter included in the package data and
if each of the points included in the package data do not match any one of representative points, the processing circuitry lists the package data of points that do not match any one of the representative points, and
the processing circuitry search a position for inserting a plan to deliver the package to the point of each package data of the listed package data into the first deliver plan in order to meet the optimization criteria based on the delivery device data, and the inter-point distance time, and add the plan to the position in the first delivery plan or the modified first delivery plan to obtain a second delivery plan which the first delivery plan or the modified first plan is updated data.

3. The information processing apparatus according to claim 2, wherein the processing circuitry controls the selected delivery device on which the packages to be delivered to the points included in the second delivery plan are mounted, based on the second delivery plan.

4. The information processing apparatus according to claim 2, wherein when all parameters of the points matching the representative points in the package historical data are the same, any one of the parameters is associated with the representative points in the first delivery plan.

5. The information processing apparatus according to claim 1, wherein when parameters of the points matching the representative points in the package historical data are different from each other, a parameter that is virtually set is associated with the representative points in the first delivery plan.

6. The information processing apparatus according to claim 1, wherein the first delivery plan is optimized so as to meet a delivery restriction.

7. The information processing apparatus according to claim 1, wherein the processing circuitry controls a display to display the extracted representative points and adds a representative point in accordance with an instruction signal from the user.

8. The information processing apparatus according to claim 1, wherein the processing circuitry controls a display to display the extracted representative points and deletes a representative point in accordance with an instruction signal from a user.

9. The information processing apparatus according to claim 8, wherein a representative point added by the user is a point different from a point recorded when a package is delivered.

10. The information processing apparatus according to claim 9, wherein the processing circuitry associates a parameter that is virtually set with a representative point added by the user.

11. The information processing apparatus according to claim 7, wherein the processing circuitry controls an arrangement of the first delivery plan to be displayed on a screen of a display map based on the representative points and GIS data.

12. The information processing apparatus according to claim 11, wherein the processing circuitry sets a center of gravity of a plurality of points specified by the user on the map as a representative point.

13. The information processing apparatus according to claim 2, wherein the processing circuitry deletes, from the first delivery plan, a plan including the representative point that does not match a point included in the package data.

14. The information processing apparatus according to claim 2, wherein a total of plans in the second delivery plan is more than or equal to a total of plans in the first delivery plan.

15. An information processing system comprising:
a first hardware storage configured to store package historical data recorded when packages are delivered by a delivery device, the package historical data including points where the packages were delivered and parameters related to the characteristics of the packages;
a parameter input circuit configured to receive parameters input from a user, including a historical period or package characteristics to be used for designing a route of a regular delivery;

processing circuitry configured to
    selecting from the first hardware storage the package historical data that matches the user-input parameters, extract representative points that appear at a rate higher than or equal to a predetermined appearance rate, based on the selected package historical data, and
    set, for each of the extracted representative points, the parameter related to the characteristics of the package included in one of the package historical data which includes the representative point or a parameter related to characteristics of a package which is virtually generated from the parameters related to the characteristics of the packages in the past historical data that includes the representative point;
  a second hardware storage configured to store delivery device data indicating characteristics of a plurality of delivery devices, including types, capacities, and usage fees of the delivery devices, respectively, of the plurality of delivery devices; and
  a third hardware storage configured to store inter-point distance time data that includes a distance between any two points and a time taken to perform a delivery for the distance between the any two points, a first delivery plan including an order of delivery of the representative points where the packages are delivered; and
  a display configured to display data or information on a screen;
  wherein the processing circuitry solves an optimization problem, based on the delivery device data and the inter-point distance time data, to meet an optimization criteria of total delivery distance and delivery cost, to result in selecting one of the delivery devices, and determining an order of delivery of the extracted representative points and arrival times and departure times at the extracted representative point, and generates the first delivery plan by allocating the parameters related the characteristics of the packages which is set for the extracted representative points parameters, the first delivery plan being for each days in a future period corresponding to the historical period or the first delivery plan being a deliver plan per day for packages with same characteristics as the package characteristics to be used for designing the route of the regular deliver inputted by the user, and the first delivery plan does not include any points other than the extracted representative points; and
  the display displays the first delivery plan and the second delivery plan on a map together with the representative points.

16. The information processing system according to claim 15, wherein the display displays the extracted representative points on the screen and the processing circuitry adds or deletes a representative point in accordance with an instruction signal input from the user.

17. The information processing system according to claim 16, wherein a representative point added by the user is a point different from a point recorded when a package is delivered.

18. The information processing system according to claim 15, wherein the processing circuitry sets a center of gravity of the plurality of points specified by a user on the map as a representative point.

19. The information processing system according to claim 15, wherein the processing circuitry switches the first delivery plan and the second delivery plan displayed on the display based on an instruction signal input from the user.

20. The information processing system according to claim 15, wherein the first delivery plan is a regular delivery plan.

21. An information processing method comprising:
  storing, a first hardware storage, package historical data recorded when packages are delivered by a delivery device, the package historical data including points where the packages were delivered and parameters related to the characteristics of the packages;
  receiving parameters input from a user, including a historical period or package characteristics to be used for designing a route of a regular delivery;
  selecting from the first hardware storage the package historical data that matches the user-input parameters, extract representative points that appear at a rate higher than or equal to a predetermined appearance rate, based on the selected package historical data, and
  setting, for each of the extracted representative points, the parameter related to the characteristics of the package included in one of the package historical data which includes the representative point or a parameter related to characteristics of a package which is virtually generated from the parameters related to the characteristics of the packages in the past historical data that includes the representative point;
  storing, in a second hardware storage, delivery device data indicating characteristics of a plurality of delivery devices, including types, capacities, and usage fees of the delivery devices, respectively, of the plurality of delivery devices; and
  storing, in a third hardware storage, inter-point distance time data that includes a distance between any two points and a time taken to perform a delivery for the distance between the any two points, a first delivery plan including an order of delivery of the representative points where the packages are delivered;
  solving an optimization problem, based on the delivery device data and the inter-point distance time data, to meet an optimization criteria of total delivery distance and delivery cost, to result in selecting one of the delivery devices, and determining an order of delivery of the extracted representative points and arrival times and departure times at the extracted representative point, and generates the first delivery plan by allocating the parameters related the characteristics of the packages which is set for the extracted representative points parameters, the first delivery plan being for each days in a future period corresponding to the historical period or the first delivery plan being a deliver plan per day for packages with same characteristics as the package characteristics to be used for designing the route of the regular deliver inputted by the user, and the first delivery plan does not include any points other than the extracted representative points.

22. A non-transitory computer readable medium having a program stored therein which when the program is executed by a computer, causes the computer to perform processes comprising:
  storing, a first hardware storage, package historical data recorded when packages are delivered by a delivery device, the package historical data including points where the packages were delivered and parameters related to the characteristics of the packages;
  receiving parameters input from a user, including a historical period or package characteristics to be used for designing a route of a regular delivery;
  selecting from the first hardware storage the package historical data that matches the user-input parameters, extract representative points that appear at a rate higher than or equal to a predetermined appearance rate, based on the selected package historical data, and setting, for each of the extracted representative points, the parameter related to the characteristics of the package included in one of the package historical data which includes the representative point or a parameter related to characteristics of a package which is virtually generated from the parameters related to the characteristics of the packages in the past historical data that includes the representative point;

storing, in a second hardware storage, delivery device data indicating characteristics of a plurality of delivery devices, including types, capacities, and usage fees of the delivery devices, respectively, of the plurality of delivery devices; and storing, in a third hardware storage, inter-point distance time data that includes a distance between any two points and a time taken to perform a delivery for the distance between the any two points, a first delivery plan including an order of delivery of the representative points where the packages are delivered;

solving an optimization problem, based on the delivery device data and the inter-point distance time data, to meet an optimization criteria of total delivery distance and delivery cost, to result in selecting one of the delivery devices, and determining an order of delivery of the extracted representative points and arrival times and departure times at the extracted representative point, and generates the first delivery plan by allocating the parameters related the characteristics of the packages which is set for the extracted representative points parameters, the first delivery plan being for each days in a future period corresponding to the historical period or the first delivery plan being a deliver plan per day for packages with same characteristics as the package characteristics to be used for designing the route of the regular deliver inputted by the user, and the first delivery plan does not include any points other than the extracted representative points.

23. The information processing apparatus according to claim 1, wherein the parameters related to the characteristics of the packages in the package historical data includes delivery time zones of the packages, and the parameters related to package characteristics of the packages in the package data includes delivery time zones of the packages.

24. The information processing apparatus according to claim 1, wherein the parameters related to the characteristics of the packages in the package historical data include a weight or a volume of the package; and the apparatus further comprises input circuitry configured to receive a coefficient that assumes increases or decreases in the weight or the volume of the package; and the processing circuitry adjusts the weight or the volume of the package in the parameters by multiplying the weight or the volume of the package by the coefficient.

* * * * *